United States Patent
Hosoi

(10) Patent No.: US 8,649,090 B2
(45) Date of Patent: Feb. 11, 2014

(54) REAR-PROJECTION SCREEN FOR ULTRA SHORT THROW PROJECTOR

(71) Applicant: Nobuhiro Hosoi, Tokyo (JP)

(72) Inventor: Nobuhiro Hosoi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/763,957

(22) Filed: Feb. 11, 2013

(65) Prior Publication Data

US 2013/0215503 A1     Aug. 22, 2013

(30) Foreign Application Priority Data

Feb. 22, 2012   (JP) .................................. 2012-036580

(51) Int. Cl.
  *G03B 21/60* (2006.01)
  *G03B 21/56* (2006.01)
(52) U.S. Cl.
  USPC .......................................... 359/453; 359/460
(58) Field of Classification Search
  USPC .................................................. 359/460, 453
  See application file for complete search history.

(56) References Cited

U.S. PATENT DOCUMENTS

| | | | | |
|---|---|---|---|---|
| 2,368,099 A | * | 1/1945 | Bodde | 359/486.02 |
| 4,792,209 A | * | 12/1988 | Laine et al. | 359/443 |
| 6,191,876 B1 | * | 2/2001 | Popovich | 359/15 |
| 6,768,566 B2 | * | 7/2004 | Walker | 359/15 |
| 7,297,381 B2 | * | 11/2007 | Cojocariu et al. | 428/1.3 |
| 7,443,582 B2 | * | 10/2008 | Yamauchi | 359/449 |
| 7,724,431 B2 | * | 5/2010 | Field et al. | 359/443 |
| 2006/0050380 A1 | * | 3/2006 | Yoon et al. | 359/460 |
| 2006/0066945 A1 | * | 3/2006 | Yeo et al. | 359/457 |
| 2007/0115548 A1 | * | 5/2007 | Ebina et al. | 359/460 |

FOREIGN PATENT DOCUMENTS

| | | |
|---|---|---|
| JP | H06-110131 | 4/1994 |
| JP | 2006-084586 | 3/2006 |

* cited by examiner

*Primary Examiner* — Christopher Mahoney
(74) *Attorney, Agent, or Firm* — Oblon, Spivak, McClelland, Maier & Neustadt, L.L.P.

(57) ABSTRACT

A rear-projection screen for an ultra short throw projector includes a diffusing member to diffuse incident light having a specific angular range (AR) corresponding to a hotspot area generated on the rear-projection screen, and to transmit incident light having an angular range other than the specific angular range (AR). The diffusing member is provided at an area of the rear-projection screen where light having smaller incidence angle with respect to the rear-projection screen strikes the rear-projection screen.

12 Claims, 3 Drawing Sheets

FIG. 1A
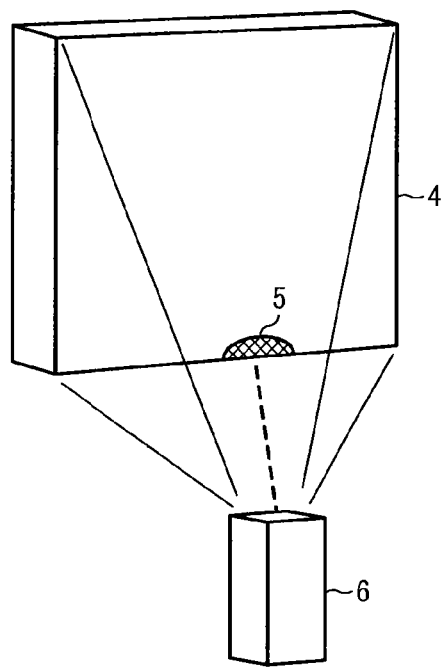
FIG. 1B
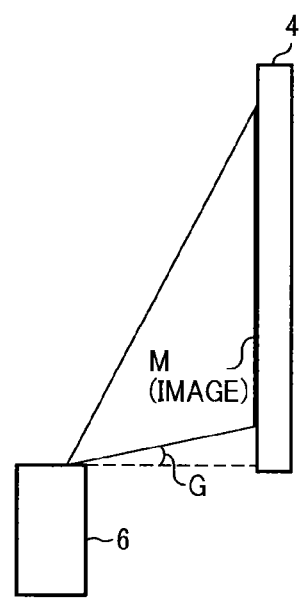
FIG. 2A  FIG. 2B
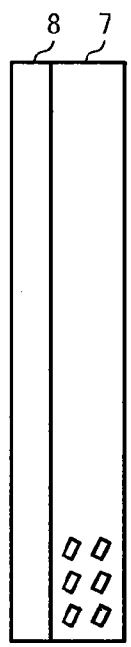 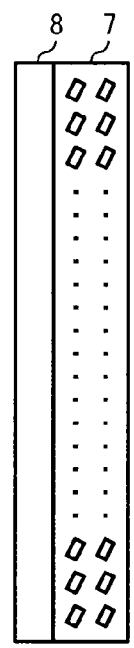
FIG. 3
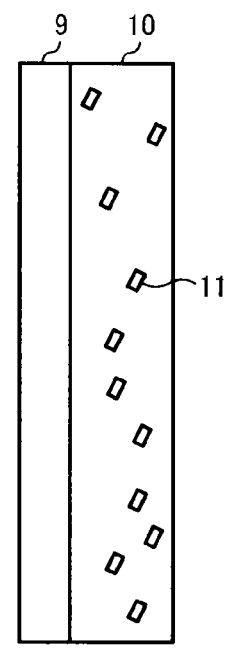

REAR-PROJECTION SCREEN FOR ULTRA SHORT THROW PROJECTOR

CROSS-REFERENCE TO RELATED APPLICATION

This application claims priority pursuant to 35 U.S.C. §119 to Japanese Patent Application No. 2012-036580, filed on Feb. 22, 2012 in the Japan Patent Office, the disclosure of which is incorporated by reference herein in its entirety.

BACKGROUND

1. Technical Field

The present invention relates to a projection screen, and more particularly to a rear-projection screen for an ultra short throw projector.

2. Background Art

When an image is projected onto a high-gain type screen such as a front-projection screen or a rear-projection screen using a projector, a localized area of high luminance known as a hotspot is generated on the screen. In conventional projectors, such hotspots typically occur on a part of the high-gain type screen which may be relatively close to the projector compared to other areas of the screen, that is, a part of the screen where the angle of incidence of the projected image onto the screen is small.

Thus, for example, in the case of an ultra short throw projector, light exiting from a lens is reflected by a mirror, and then projected at an angle to the screen. Therefore, when an image is projected onto the rear-projection screen, the hotspot is generated at the lower center of the screen image, which corresponds to an area where the projected light having a smaller incidence angle strikes the screen.

The luminance of such hotspots can be reduced by providing a light-diffusing layer or sheet that can diffuse incident light at a part of the screen. Thus, for example, JP-2006-84586-A discloses a technology using a light-diffusing layer or sheet to diffuse incident light to achieve a screen having high gain and a broader viewing angle. In particular, JP-2006-84586-A discloses a front-projection screen composed of a reflecting layer and a light-diffusing layer, in which the light-diffusing layer is disposed on the reflecting layer. The light-diffusing layer diffuses incident light having a specific angular range and transmits incident light having any other angular. Such specific angular range is arranged substantially symmetrically about the optical axis of light exiting the projector, or about a direction perpendicular to the optical axis and a direction perpendicular to the screen.

However, if such a configuration is applied to an ultra short focus projector projecting onto a rear-projection screen, the rear-projection screen passes through most of the incident light at the hotspot. Since the hotspot cannot be eliminated, there is a lot of fluctuation in luminance level.

SUMMARY

In one aspect of the present invention, a rear-projection screen for an ultra short throw projector is devised. The rear-projection screen includes a diffusing member to diffuse incident light having a specific angular range (AR) corresponding to a hotspot area generated on the rear-projection screen, and to transmit incident light having an angular range other than the specific angular range (AR). The diffusing member is provided at an area of the rear-projection screen where light having smaller incidence angle with respect to the rear-projection screen strikes the rear-projection screen.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 1A and 1B show a schematic view of a rear-projection screen for a ultra short throw projector according to a first example embodiment and a hotspot;

FIGS. 2A and 2B show schematic views of a rear-projection screen according to the first example embodiment;

FIG. 3 shows a schematic view of another rear-projection screen for a ultra short throw projector according to the first example embodiment;

Figure 4A:
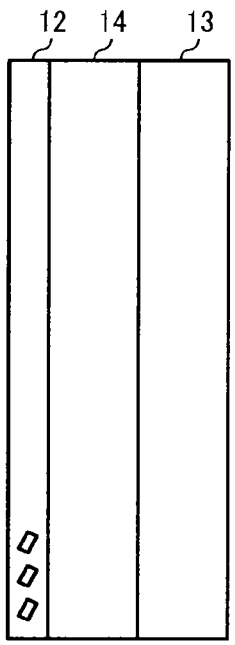
FIGS. 4A, 4B, and 4C show schematic views of a rear-projection screen for an ultra short throw projector according to a second example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that have a similar function, operate in a similar manner, and achieve a similar result.

Referring now to the drawings, apparatuses or systems according to example embodiments are described hereinafter.

A rear-projection screen for a short-focus projector or ultra short throw projector includes a light diffusion member such as a light-diffusing layer or a light-diffusing sheet. To be described later, the light-diffusing layer includes micro particles therein. The micro particles are plate-like or cylindrical members having a long side and a short side, and are arranged at an area where the projected light strikes the screen at smaller incidence angles. The suitable incidence angle varies for various projectors. The light-diffusing layer or sheet can diffuse incident light having smaller incidence angles, and transmit incident light having other incidence angles.

When an image is projected onto the rear-projection screen by using a short throw projector such as an ultra short throw projector, the incident light at the hotspot area, which occurs at an area hit by the incident light having smaller incidence angles, can be diffused, by which luminance at the hotspot area can be suppressed.

As such, the micro particles are arranged at least at an area in a diffusion-reflecting layer of the rear-projection screen, corresponding to an area hit by the incidence light having smaller incidence angles. Such micro particles can diffuse only the light having smaller incidence angles, by which light transmittance can be decreased only at the hotspot area, and thereby an image having uniform luminance can be generated and projected on the screen.

Figure 7:
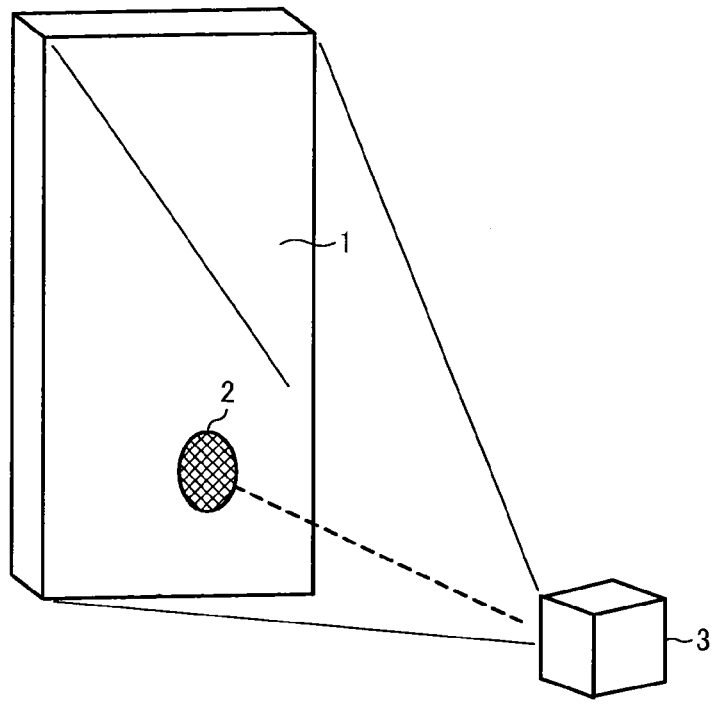
FIG. 7 shows a schematic view of a conventional projector and a hotspot.

With reference to drawings, a description is given of a rear-projection screen useable with an ultra short throw projector. FIG. 7 schematically shows a conventional projector and a hotspot, in which a rear-projection screen 1 is a light transmission type screen, and a hotspot 2 is generated when a projector 3 projects an image on the rear-projection screen 1.

When the projector 3 projects an image onto the rear-projection screen, the hotspot 2 is generated at an area hit by the incidence light having smaller incidence angles with respect to the rear-projection screen 1.

First Example Embodiment

FIGS. 1A and 1B show a schematic view of a rear-projection screen according to a first example embodiment useable with a short throw projector such as an ultra short throw projector, and a hotspot generated on the screen. FIG. 1A shows a rear-projection screen 4, an ultra short throw projector 6, and a hotspot 5. In this disclosure, the ultra short throw projector 6 is used as one example of short throw projectors. The light exiting from the ultra short throw projector 6 is projected on the rear-projection screen 4 as an image M as shown in FIG. 1B. In this embodiment, the lower end of the image M projected on the rear-projection screen 4 and the upper end of the ultra-short-focus projector 6 set a given angle G as shown in FIG. 1B, wherein the angle G may be set, for example, 10-60 degrees, but not limited thereto.

When the ultra short throw projector 6 projects an image onto the rear-projection screen 4, the hotspot may be generated at an area corresponding to the lower center of screen, which is hit by the incidence light having smaller incidence angles with respect to the screen. Such incidence angles vary for various projectors. The incidence angle of incidence light that causes hotspot may be referred to a specific angular range (AR) in this disclosure.

FIGS. 2A and 2B show schematic views of a rear-projection screen useable with the ultra short throw projector 6. As shown in FIGS. 2A and 2B, the rear-projection screen can be configured with a light-diffusing layer 7, and a screen body 8. As for such rear-projection screen useable with the ultra short throw projector 6, plate-like micro particles are arranged at a part or an entire of the light-diffusing layer 7 of the rear-projection screen so that the incidence light having smaller incidence angles hit an area having the plate-like micro particles. With such a configuration, only the light having smaller incidence angles can be diffused, and the light transmittance can be decreased only at the hotspot area, by which an image having uniform luminance can be generated and projected on the screen.

Therefore, when the ultra short throw projector 6 projects an image onto the above described rear-projection screen shown in FIGS. 2A and 2B, the hotspot may not occur, and an image having reduced fluctuation of luminance level can be generated. In this disclosure, particles mean substantially cylindrical-shaped micro members, and the plate-like micro particles is one example of cylindrical-shaped micro members. By arranging the cylindrical-shaped micro members at a part or an entire of the light-diffusing layer, the incident light can be effectively diffused and transmitted.

FIG. 3 shows a schematic view of the rear-projection screen according to an example embodiment useable with the ultra short throw projector 6. The rear-projection screen includes a light-diffusing layer 10, a base 9 such as an acryl or glass base, and plate-like micro particles 11 included in the base 10. In the rear-projection screen of FIG. 3, the light-diffusing layer 10 including the plate-like micro particles 11 is disposed at an incident side of the base 9.

The plate-like micro particles 11 are, for example, inorganic particles such as barium sulfate having size of 0.1 to 10 μm or so, but not limited thereto.

As for the rear-projection screen useable with the ultra short throw projector 6 of the first example embodiment, when the ultra short throw projector 6 projects an image onto the rear-projection screen, the hotspot may not be generated, and an image having reduced the fluctuation of luminance level can be generated.

Second Example Embodiment

Figure 4B:
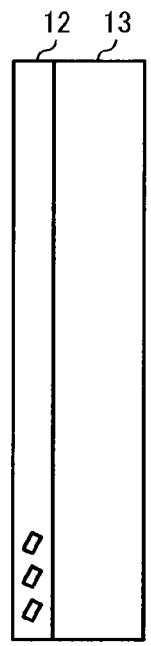
Figure 4C:
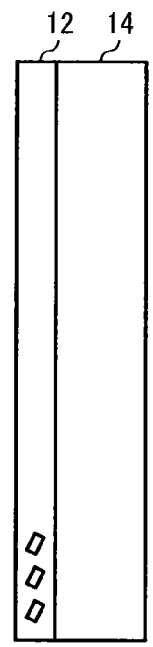

FIG. 4A shows a schematic view of a rear-projection screen according to a second example embodiment useable with the ultra short throw projector 6. The rear-projection screen of FIG. 4A includes a light-diffusing layer 12, and optical lenses such as a fresnel lens 13, and a lenticular lens 14. By stacking the lenticular lens 14 on the Fresnel lens 13, the rear-projection screen useable with the ultra short throw projector 6 can generate a more uniform luminance profile. The rear-projection screen includes the light-diffusing layer 12 at an incidence side of light. Further, as shown in FIGS. 4B and 4C, the rear-projection screen can be configured with the light-diffusing layer 12 and the Fresnel lens 13, and the rear-projection screen can be configured with the light-diffusing layer 12 and the lenticular lens 14. As such, the rear-projection screen can be configured with a diffusion layer and at least one optical lens overlaid on the diffusion layer.

The light-diffusing layer is, for example, a layer made of transparent resin such as acryl and polyester, and including plate-like micro particles therein. The plate-like micro particles may be, for example, composed of amorphous inorganic substance coated with metal or metallic oxide, wherein the amorphous inorganic substance is may be, for example, mica having a size of 1 to 1000 μm and the metal or metallic oxide may be, for example, titanium. As for the rear-projection screen of the second example embodiment useable with the ultra short throw projector 6, when the ultra short throw projector 6 projects an image onto the rear-projection screen, the hotspot may not be generated, and an image having reduced the fluctuation of luminance level can be generated.

Third Example Embodiment

Figure 5:
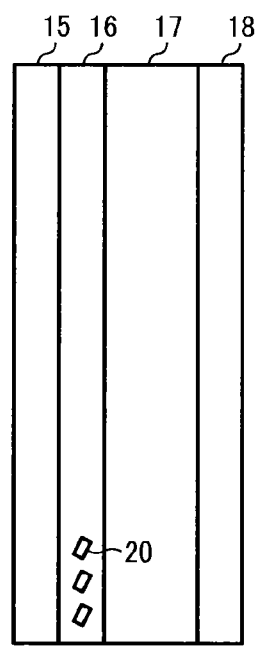
FIG. 5 shows a schematic view of a rear-projection screen for an ultra short throw projector according to a third example embodiment.

FIG. 5 shows a schematic view of the rear-projection screen according to a third example embodiment useable with the ultra short throw projector 6. The rear-projection screen of FIG. 5 includes a hard coat 15, a light-diffusing layer 16 such as a diffusing sheet, a polyethylene terephthalate (PET) layer 17, and an adhesive layer 18. The rear-projection screen useable with the ultra short throw projector 6 can be applied for a film type rear-projection screen having the adhesive layer 18.

The hard coat 15 is, for example, a transparent film such as polyester or the like. The light-diffusing layer 16 can be made of materials suitable for diffusing light. The adhesive layer 18 is, for example, typical adhesives and double-sided tape. By adhering the rear-projection screen on a transparent member such as a window glass of a showroom using the adhesive layer 18, the rear-projection screen of FIG. 5 can be used as a screen attached on the window glass. As for the rear-projection screen useable with the ultra short throw projector 6 of the third example embodiment, when the ultra short throw projector 6 projects an image onto the rear-projection screen, the hotspot may not be generated, and an image having reduced the fluctuation of luminance level can be generated.

Figure 6:
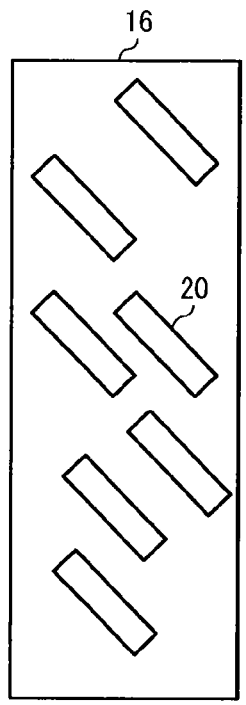
FIG. 6 shows a detailed view of light-diffusing layer of FIG. 5.

FIG. 6 shows a detailed view of the light-diffusing layer 16 in FIG. 5. FIG. 6 shows the light-diffusing layer 16, and plate-like micro particles 20. The light-diffusing layer 16 includes the plate-like micro particles 20 arranged at least at a portion corresponding to an area hit by the incident light having smaller incidence angles. As for the rear-projection screen useable with the ultra short throw projector 6 of the third example embodiment, when the ultra short throw projector 6 projects an image onto the rear-projection screen, the hotspot may not be generated, and an image having reduced the fluctuation of luminance level can be generated.

In the above described example embodiments, the specific angular range (AR) can be decreased with a given angle to reduce the luminance at the hotspot area, by which the effect of the hotspot area to the luminance at an area other than the hotspot area can be reduced, wherein the given angle is, for example, 5 degrees. Further, in the above described example embodiments, the specific angular range (AR) can be increased with a given angle to cope with a broader hotspot area, wherein the given angle is, for example, 5 degrees.

In the above-described example embodiments for the rear-projection screen, the hotspot may not occur to an image projected on a rear-projection screen by using an ultra short throw projector, and such image can be projected with less fluctuation of luminance level over the image.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A rear-projection screen for an ultra short throw projector, comprising:
    a diffusing member which diffuses only incident light exiting the projector and projected on the rear-projection screen having a specific angular range (AR) corresponding to a hotspot area generated on the rear-projection screen, and which transmits incident light having an angular range other than the specific angular range (AR),
    wherein the specific angular range (AR) is an incidence angle of the incident light that causes the hotspot, and
    wherein the diffusing member is provided at an area of the rear-projection screen where light having smaller incidence angle with respect to the rear-projection screen strikes the rear-projection screen.

2. The rear-projection screen of claim 1, wherein the specific angular range (AR) is decreased by a given angle to reduce luminance at the hotspot area to reduce an effect of the hotspot area to luminance at an area other than the hotspot area.

3. The rear-projection screen of claim 1, wherein the specific angular range (AR) is increased by a given angle to cope with a broader hotspot area.

4. The rear-projection screen of claim 1, further comprising an adhesive layer and a transparent layer,
    wherein the adhesive layer is attachable to the transparent layer.

5. The rear-projection screen of claim 1, wherein the diffusing member includes substantially cylindrical-shaped micro particles.

6. The rear-projection screen of claim 5, wherein the cylindrical-shaped micro particles are inorganic particles having size of 0.1 to 10 µm.

7. The rear-projection screen of claim 5, wherein the diffusing member is a layer of transparent resin including the cylindrical-shaped micro particles,
    wherein the micro particles comprise an amorphous inorganic substance coated with metal or metallic oxide.

8. The rear-projection screen of claim 7, wherein a portion of the diffusing member is free of the micro particles.

9. The rear-projection screen of claim 7, wherein the micro particles are arranged at an entire of the diffusing member.

10. The rear-projection screen of claim 1, further comprising an optical lens overlaid on the diffusing member.

11. The rear-projection screen of claim 10, wherein the optical lens is a Frensel lens.

12. The rear-projection screen of claim 10, wherein the optical lens is a lenticular lens.

* * * * *